Nov. 23, 1965  E. C. KASTNER ETAL  3,219,338
STOCK CUTTER-STACKER AND METHOD
Filed March 6, 1962  12 Sheets-Sheet 2

Fig. 2

INVENTORS
EDWARD C. KASTNER
DOYLE L. DUGGER

BY

Jeane, Fetzer & Jeane
ATTORNEYS

Nov. 23, 1965 E. C. KASTNER ETAL 3,219,338
STOCK CUTTER-STACKER AND METHOD
Filed March 6, 1962 12 Sheets-Sheet 4

INVENTORS
EDWARD C. KASTNER AND
DOYLE L. DUGGER
BY
Teare, Telzer & Teare
ATTORNEYS Nov. 23, 1965   E. C. KASTNER ETAL   3,219,338
STOCK CUTTER-STACKER AND METHOD
Filed March 6, 1962   12 Sheets-Sheet 5

INVENTORS
EDWARD C. KASTNER AND
DOYLE L. DUGGER
BY
Jeane, Fetzer & Jeane
ATTORNEYS Nov. 23, 1965  E. C. KASTNER ETAL  3,219,338
STOCK CUTTER-STACKER AND METHOD
Filed March 6, 1962  12 Sheets-Sheet 7

INVENTORS
EDWARD C. KASTNER AND
DOYLE L. DUGGER
BY
Teare, Fetzer & Teare
ATTORNEYS

United States Patent Office 3,219,338
Patented Nov. 23, 1965

3,219,338
STOCK CUTTER-STACKER AND METHOD
Edward C. Kastner, Akron, and Doyle L. Dugger, Tallmadge, Ohio, assignors to The Akron Standard Mold Company, Akron, Ohio, a corporation of Ohio
Filed Mar. 6, 1962, Ser. No. 177,814
12 Claims. (Cl. 270—31)

This invention relates in general to stock cutting mechanism and more particularly to a combined stock cutting and stacking mechanism, adapted for use in cutting and stacking an elongated strip of stock, for instance rubber stock coming off of a batch-off mechanism or the like, and for use in the formation of a product, such as for instance vehicle tires.

Rubber stock material being emitted from a batch-off apparatus comes out in continuous strip form, and has to be subsequently cut into predetermined lengths for use as for instance in the molding of rubber tires and the like. This cutting operation heretofore was often times in the form of a time consuming manual operation, to cut the stock into the desired lengths, after which the cut stock was stacked for further processing.

The present invention provides a novel apparatus for taking a continuous ribbon of rubber stock, such as a ribbon of stock coming off of a "batch-off" cooling rack, cutting it into uniform length slabs, and stacking such slabs on a receiving surface, for ready use for instance by molders in the formation of tires or other rubber products.

The mechanism broadly comprises an oscillating head equipped with a set of bite rolls which feeds the ribbon of stock material into a spiral knife, which then cuts the stock to the correct length. The stock is laid down onto a receiving table or surface which preferably automatically lowers and maintains a substantially constant distance from the top of the growing stack of stock material to the cutter head. The stroke or movement of reciprocation of the head is adjustable for changing the length of slabs of material produced from the continuous ribbon of stock. The timing of the cuts of the spiral knife may be controlled by an electrically operated clutch and brake mechanism through adjustable limit switch means mounted for actuation in the path of the cutter head's travel, thus positively controlling the length of slab of material which is cut from the continuous ribbon of rubber stock. The lengths of cut slab or stock material are preferably so cut as to be initially connected together by relatively small non-severed sections of the material, which connecting sections may be subsequently readily ruptured upon removal of a stack of the cut slabs from the machine, for expeditious and complete separation of each of the cut slabs.

Accordingly, an object of the invention is to provide a novel cutting apparatus for cutting a continuous ribbon of stock material into predetermined length slabs.

Another object of the invention is to provide a cutting apparatus of the latter type which stacks the cut stock into a pile on a receiving platform.

Another object of the invention is to provide a cutter mechanism of the aforementioned type, including a reciprocal head equipped with a set of bite rolls which feeds a continuous ribbon of stock into a spiral knife member, which cuts or perforates the stock to the correct length adjacent the end of each reciprocal stroke of the head.

A further object of the invention is to provide a cutter of the aforementioned type which includes a platform mechanism, which automatically lowers during cutting and stacking of the slabs from the continuous ribbon of stock material, thereby maintaining a substantially constant distance from the top of the growing stack to the oscillating cutter head.

A further object of the invention is to provide a cutter apparatus which can be used to accurately cut a continuous ribbon of stock material coming from a batch-off cooling rack or like mechanism, into predetermined length slabs, and stacking such slabs on a receiving platform, and in an automatic procedure, for facilitating the production of rubber tires and the like.

A still further object of the invention is to provide a novel method of cutting a continuous strip or ribbon of stock into predetermined length slabs or sheets, and stacking the latter into predetermined height stacks for subsequent use.

Other objects and advantages of the invention will be apparent from the following description taken in conjunction with the accompanying drawings wherein:

FIG. 15A is a continuation of the schematic of FIG. 15, having been divided along line A—A.

Figure 1:
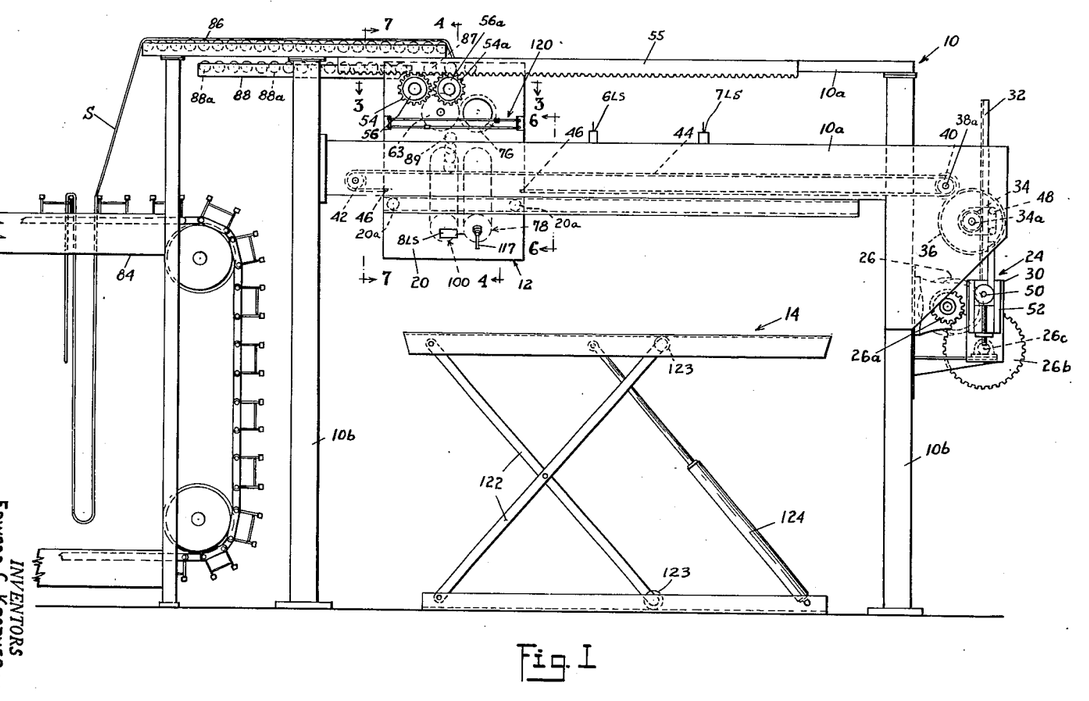
FIG. 1 is a side elevational view of the cutter and stacker including a fragmentary portion of a conventional "batch-off" loop cooling rack, transmitting a continuous strip of stock material to the mechanism of the invention.
Figure 2:
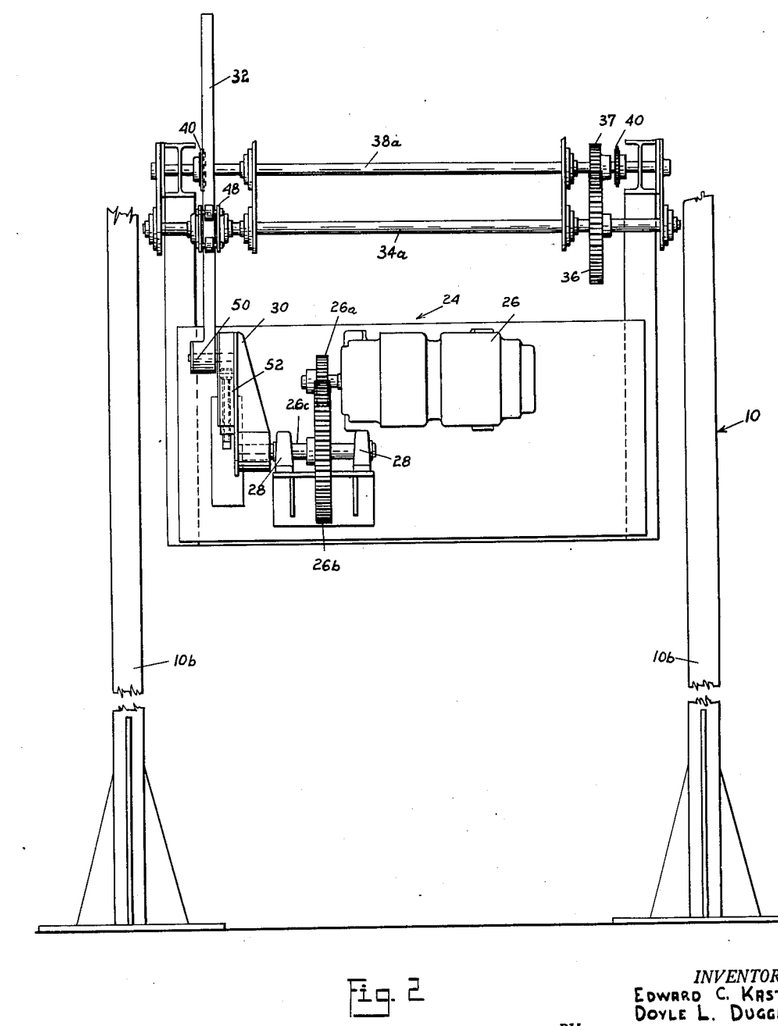
FIG. 2 is an end elevational view taken from the right hand end of FIG. 1, and illustrating the mechanism for reciprocating the cutter head.
Figure 3:
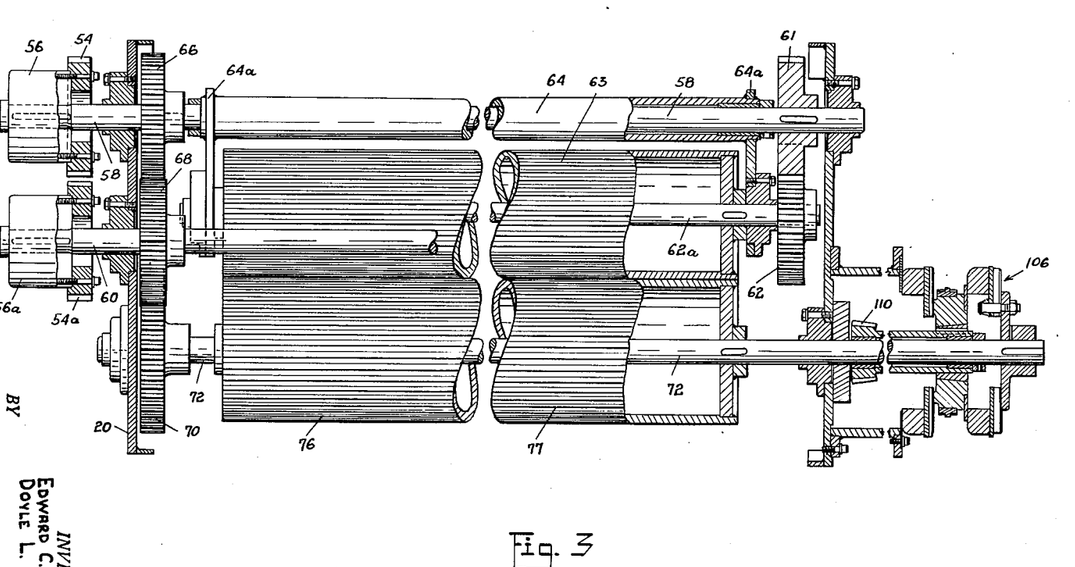
FIG. 3 is an enlarged, partially broken, sectional plan view taken generally along the plane of line 3—3 of FIG. 1, looking in the direction of the arrows, and illustrating the bite rollers of the reciprocating head of the cutter, which feed the continuous ribbon of rubber stock material into the spiral knife mechanism of the cutter head and the driving connection therefor.

Referring now again to the drawings, and in particular to FIGS. 1 and 2, the cutter mechanism of the invention broadly comprises a supporting framework structure 10, including longitudinal supports 10a and vertical supports 10b, on which are mounted the component parts of the cutter mechanism, for reciprocating movement of the cutter head 12 lengthwise of the framework 10. Disposed below the cutter head is preferably movable work or stock receiving platform 14 which is adapted to receive the predetermined length of cut slabs thereon, and to maintain the top of the pile of slabs in constant spaced relationship to the underside of the cutter head. In other words, as the cut slabs are laid in a pile on the work platform, the platform automatically lowers, and thus maintains substantially constant the distance between the top of the pile of slabs and the underside of the cutter head . This feature will hereinafter be described in greater detail.

The cutter head comprises a box-like housing 20 supported on roller members 20a (FIG. 7) which run on lengthwise extending rail members 22, supported by the framework 10.

The mechanism for causing reciprocating movement of the cutter head 12 is generally referred to by reference number 24 (FIGS. 1 and 2) and may include an electric motor 26 mounted on framework 10 and drivingly connected to a pinion gear 26a, which meshes with spur gear 26b, secured to stub shaft 26c. Shafts 26c may be supported by bearing means 28. Secured to shaft 26c is a crank, or eccentric 30 to which is adjustably and pivotally attached a generally upstanding toothed rack 32. Rack 32 meshes with pinion gear 34 secured to a shaft 34a mounted on the framework 10, which actuates gear 36 likewise secured to shaft 34a. Gear 36 meshes with gear 37 which drives shaft 38a. Shaft 38a may mount, adjacent opposite ends thereof, sprocket members 40. Another pair of rotatable sprockets 42 (FIG. 1) are disposed at the other end of the framework 10, and coacting chain elements 44 are looped about the respective paired sprocket 40, 42, and are attached as at 46 to the cutter head housing 20. It will be seen, therefore, that actuation of crank 30 by motor 26 causes up and down movement of rack 32, thereby causing reciprocating movement of cutter head 12 lengthwise of framework 10. The stroke of the cutter head 12 may be adjusted by adjusting the throw of the crank 30, as by means of moving the pivot 50 up or down in its coacting support 52. The rack 32 may be held in meshing relation with gear 34 by means of roller and strap mechanism 48, which permits the aforesaid reciprocal, or up and down movement of the rack, but which holds the rack in meshing relation with the coacting gear 34.

Rotatably mounted on housing 20 are a pair of spur gears 54, 54a, disposed in meshing relation with a stationary rack 55 (FIG. 1) mounted on framework 10. Each of said spur gears 54, 54a has a conventional overrunning clutch 56, 56a secured thereto. Overrunning clutches are well known in the clutch art, and a suitable overrunning clutch for the instant arangement is one identified as a Morse Overrunning Cam Clutch No. MC6000. The clutches 56, 56a are so arranged that clutch 56 is operative to connect or couple the associated spur gear 54 to mounting shaft 58 upon movement of the cutter head 12 in one lengthwise direction, while the other overrunning clutch 56a is automatically inoperative to connect or couple its associated spur gear 54a to its associated shaft 60, upon movement of the cutter head in said one direction. Upon movement of the cutter head 12 in the opposite direction, clutch 56a becomes operative and couples its associated spur gear 54a to shaft 60, while clutch 56 automatically becomes inoperative and its associated spur gear 54 is not drivingly coupled to shaft 58. The aforementioned shaft 58 extends transversely through the cutter housing 20, and supports in secured relation a gear 61 thereon. Gear 61 is disposed in meshing relation with gear 62, which is secured to a shaft 62a mounting a feed roll 63 thereon.

As can be best seen from FIG. 5 of the drawings, the shaft 62a of feed roll 63 is pivotally supported by aforementioned shaft 58, and as by means of sleeve 64 and arms 64a, and for a purpose to be hereinafter described.

Also mounted in secured relation on shaft 58 is another gear 66 which is disposed in meshing relation with gear 68 secured to shaft 60, and with gear 68 being disposed in meshing relation with gear 70, secured to shaft 72 extending transversely through the housing 20. Shaft 72 supports in secured relation a second feed roll 76 thereon. The feed rolls 63, 76 are preferably provided with serrated or roughened surfaces as at 77, to facilitate the gripping of the stock material by the feed rolls, and movement thereof towards the knife 78 of the cutter mechanism.

It will be seen, therefore, that upon movement of the cutter head 12 toward the right, as viewed in FIG. 1, and as actuated by mechanism 24, spur gears 54, 54a are caused to rotate counterclockwise and assuming that clutch 56 is operative to clutch gear 54 to shaft 58, feed roll 63 is caused to rotate in a clockwise direction, as viewed in FIG. 1, due to clockwise rotation of gear 62, while feed roll 76 is caused to rotate in a counterclockwise rotation of its driving gear 70, gear 70 being actuated from shaft 58 via gears 66 and 68. This driving rotation of the feed rolls 63, 76 causes downward movement of the stock toward the cutter knife 78 rotatably mounted in the cutter head 12. During the aforedescribed movement of the cutter head, clutch 56a maintains gear 54a in uncoupled and thus inoperative condition. During the backward stroke, or movement of the cutter head to the left, as viewed in FIG. 1, the clutch mechanism 56a becomes operative, while clutch mechanism 56 becomes inoperative. Therefore, since gear 54a is thus coupled to shaft 60 and is rotating in a clockwise direction (with reference to FIG. 1) it actuates gear 68 which actuates gear 70, thereby rotating the feed roll 76 in a counterclockwise direction, while gears 66, 61 and 62 are rotating feed roll 63 in a clockwise direction, thereby continuously feeding material down to the cutter knife 78.

As best illustrated in FIG. 1, the stock S may be coming off a loop cooking rack 84 of a batch-off mechanism (well known in the rubber art) wherein it passes upwardly along threading roller conveyor mechanism 86 and then downwardly along roller means 87 on the cutter head and into the bite of the feed rollers 63, 76. As illustrated in FIG. 1, head 12 may have an extension 88 thereon mounting further roller means 88a, for supporting the stock during movement of the head along framework 10. The head is also preferably provided with a plurality of idler wheel or roller members 89 thereon for facilitating movement of the ribbon of stock material down toward the cutter knife 78.

Figure 5:
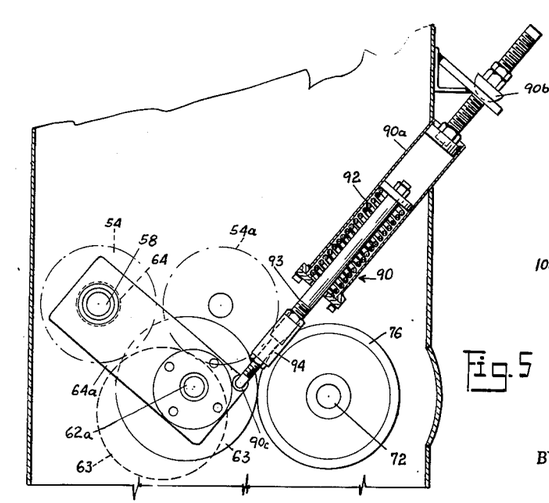
FIG. 5 is an enlarged, fragmentary, sectional view illustrating the spring mechanism assembly on the head which provides for resiliently holding the bite rollers together and for adjusting the pressure of the bite rollers of the head of the cutter mechanism.

Referring now in particular to FIGS. 1 and 5, the feed roll 63, as aforementioned, is pivoted to shaft 58, and there is provided a resilient snubber mechanism 90 for resiliently urging the feed rolls together and for adjusting the pressure between feed rolls 63, 76. Such snubber mechanism 90 may include a housing 90a adjustably secured as at 90b to the cutter head housing, and as at 90c to one of arms 64a of the pivot structure supporting feed roll 63. A spring 92 may be disposed in housing 90a, with a shaft 93 extending outwardly of the housing and connected as aforementioned at 90c to arm 64a. Adjustment of the turn-buckle like sleeve 94 on shaft 93 adjusts the compression of spring 92, and thus the force between feed rolls 63, 76.

Figure 4:
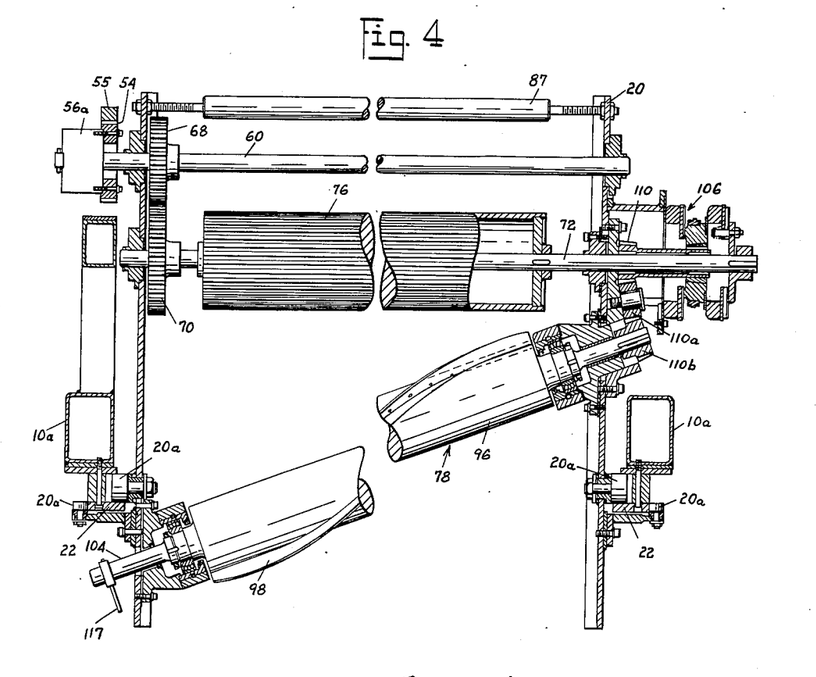
FIG. 4 is an enlarged, vertical sectional, broken view of the cutter head taken generally along the plane of line 4—4 of FIG. 1 and illustrating the spiral cutter knife which cuts the stock material into the correct, predetermined lengths at each end of the reciprocating stroke of the head.
Figure 4A:
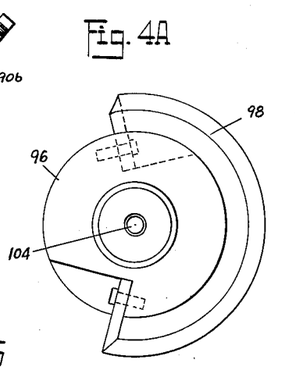
FIG. 4A is an enlarged end view of the cutter knife roll of FIG. 4 taken from the left hand end thereof.
Figure 6:
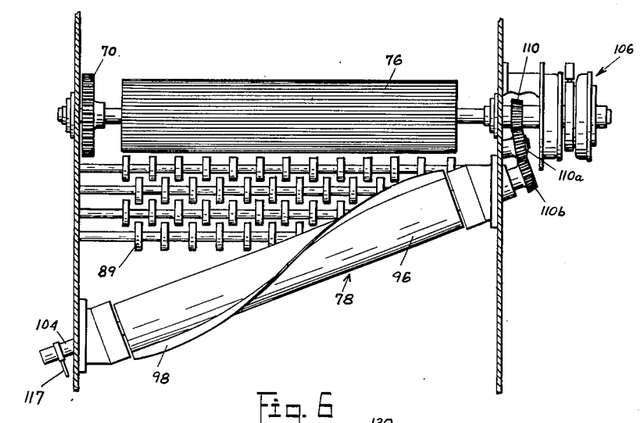
FIG. 6 is a fragmentary, broken end elevational view of the cutter head taken generally along the plane of line 6—6 of FIG. 1, and illustrating a portion of the idler rollers for facilitating movement of the stock into the cutter knife.

Referring now to FIGS. 4, 4A and 6, the cutting knife 78 of the cutter head comprises a cylindrical-like roll 96 having mounted thereon a spiral blade 98. A suitable arrangement has been found to have the spiral blade approximately 1¼" high and disposed at about 14½° angle to the axis of the roll. A back-up anvil roll 100 is provided, with the knife roll 78 and the back-up roll 100 being mounted on parallel axes in the cutter head housing, and set at approximately a 20° angle with respect to the horizontal (FIG. 4). The blade 98 wraps approximately 209° around the roll 96, speaking circumferentially, normally leaving a space, and for instance about 1¼", between the knife roll and the back-up anvil roll 100, for passage of the stock material therebetween prior to the cutting operation.

Referring now to FIG. 4, the shaft 104 of the knife roll is driven from the shaft 72 of feed roll 76. In this connection there is provided a conventional, electrically actuated, clutch-brake assembly 106 on the end of shaft 72 exteriorly of housing 20. Clutch-brake mechanism 106 is well known in the clutch art, and a suitable arrangement has been found to be a Warner No. PCB1000 clutch-brake assembly. Upon actuation of the clutch portion of mechanism 106, the shaft 72 of feed roll 76 is coupled to the shaft 104 of the cutter knife 78. This is accomplished by means of the gearing members 110, 110a, 110b, which are normally held fixed during rotation of the shaft 72, by the braking mechanism of unit 106 but which are drivingly coupled to shaft 72 upon actuation of the clutch of mechanism 106.

When a cut is to be made on the stock being fed down between feed rolls 63, 76, the brake of mechanism 106 is released and the clutch mechanism thereof is energized in a manner to be hereinafter described, thereby causing the knife roll to make one compete revolution. The clutch of mechanism 106 then automatically releases and the brake again holds the cutter knife stationary until the next cut. In the cutting operation, the tangent point on the blade intersects the surface of the anvil roll 100 at only one point at any one time, so as the two rolls 96, 100 are turned relative to each other, this point passes from one end of the anvil roll to the other end thereof. With the rolls set at the aforementioned 20° angle with the horizontal, the contact point or stock shearing point moves horizontally across the stock while the stock is moving downwardly. In an applicable vector diagram of the forces involved, the horizontal component is the cutting speed, the vertical component is the stock travel speed, and the hypotenuse is the cutting roll or knife rotation speed. Since the cutting action is a progressive shearing of a relatively small length of stock at any given instant, the knife is of much lighter construction than that which would be required in a knife making a full width cut all at once.

Figure 7:
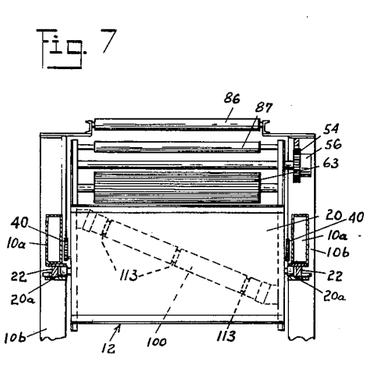
FIG. 7 is a fragmentary, vertical sectional view taken generally along the plane of line 7—7 of FIG. 1 and illustrating the means for movably mounting the cutter head on the supporting framework of the mechanism and illustrating in phantom lines the back up roll which coacts with the cutter knife roll to sever or perforate the continuous ribbon of stock into cut slabs.
Figures 9, 9A, 14, 14A:
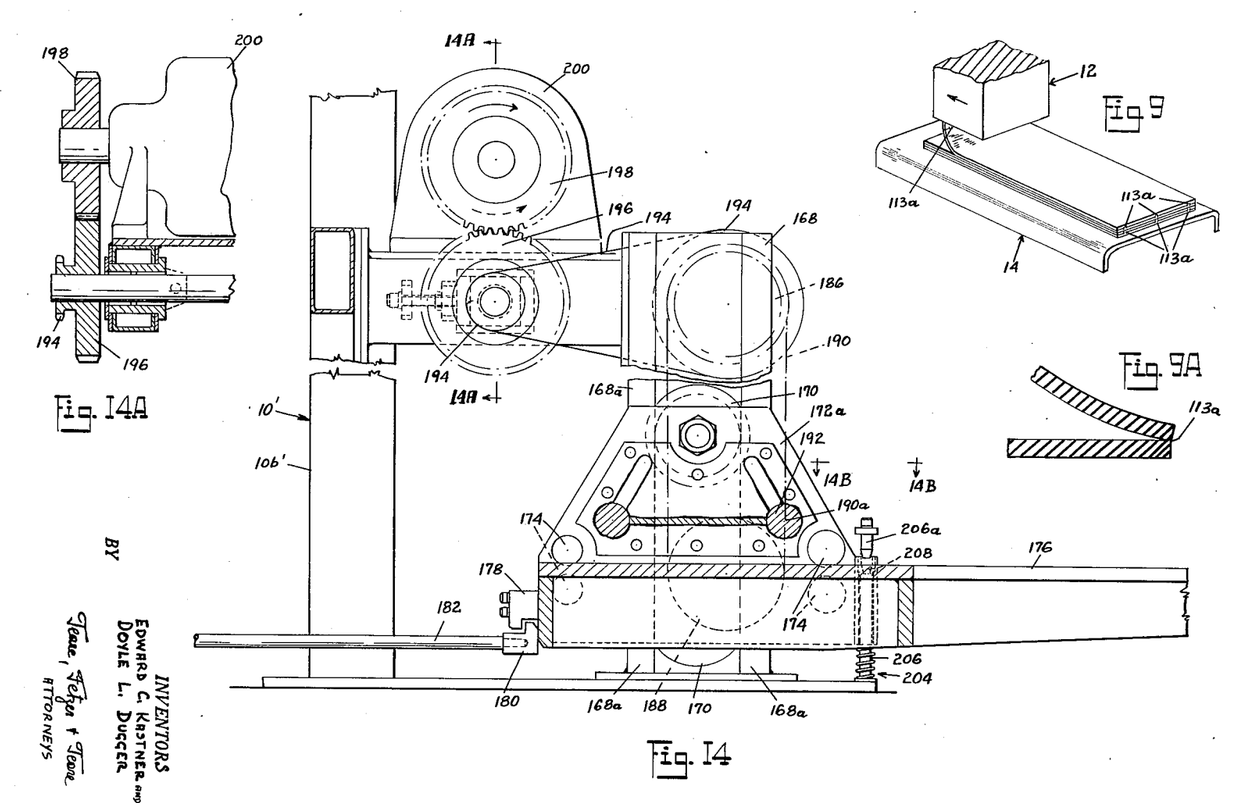
FIG. 9 is a fragmentary, more or less diagrammatic illustration of the stock material being cut into predetermined length slabs by the rotary cutter and illustrating the relatively small connecting portions of unsevered stock material which serves to temporarily connect the cut slabs together.
FIG. 9A is an enlarged, sectional, fragmentary illustration of one of the connecting portions of FIG. 9, connecting together adjacent ends of a pair of cut slabs.
FIG. 14 is an enlarged, broken sectional view taken generally along the plane of line 14—14 of FIG. 11 looking in the direction of the arrows.
FIG. 14A is a reduced size, fragmentary, vertical section taken generally along line 14A—14A of FIG. 14.

Referring now to FIGS. 7, 9 and 9A, the anvil or back-up roll 100 preferably embodies a plurality of relatively small width, say for instance one-half inch width, circumferentially extending grooves 113 in its surface. Thus as the knife 98 on roll 96 turns against the surface of the anvil roll 100 and slices through the stock material, some of the material overlying the grooves 113 is depressed into the respective groove and is not sheared by the rotating knife. Thus the cut slabs or sheets of stock are connected together by the relatively small sections 113a of non-cut material which in effect maintain a partial connection between the cut slabs as they are laid down on platform 14 and facilitate the maintenance of an orderly "lay down" as the slabs are laid back and forth on one another by the reciprocal cutter head. These connecting sections 113a of material are of such nature that they can be readily ruptured upon application of a tension or torsion force by a workman, to accomplish complete separation of the individual slabs. In this connection, the sections 113a are adapted to rupture upon movement of a stack of the cut slabs away from under the cutter head, so as to readily separate the uppermost slab in the stack from the strip of material passing through the cutter head, and without necessitating a further manual shearing operation by a workman.

In order to time the rotation of the cutting mechanism 78, there may be provided limit switches 6LS, 7LS of conventional type disposed in the path of the carriage head's travel, and coupled in the conventional manner in the electrical system of the brake-clutch mechanism 106. When contact is made between preferably adjustable contact mechanism 120 on the cutter head 12 and the respective limit switch, the clutch portion of the brake-clutch mechanism 106 is actuated and the brake mechanism is deactivated, thereby rotating the cutter knife 78. As the spiral knife rotates and slices through the stock material, the cut slab from the stock is laid down upon the stack on receiving platform 14 disposed beneath the head 12. Adjustable dog 117 on the cutter roll 96 is adapted to actuate limit switch 8LS after one rotation of the cutter roll and apply the brake of mechanism 106.

It will be seen that by adjusting the stroke of the crank mechanism 30, the stroke or length of travel of the head 12 can be varied, and by changing the position of the brake-clutch actuating mechanism 120, a change in the length of slab cut from the stock material may be accomplished. As each cut is made, and the head commences moving back in the opposite direction, the cut stock material connected by section 113a is fed down upon the underlying stack of cut slabs, so that the latter are disposed in orderly stack condition, connected only at their ends by aforementioned sections 113a.

The aforementioned platform 14 may comprise a scissors-like framework 122, including roller means 123, and embodying a fluid actuated piston and cyinder motor unit 124, which is preferably automatically actuated by means of conventional valve mechanism, to lower the platform as the stack of slabs is built up thereon, thereby maintaining a generally constant distance between the top of the stack and the underside of the cutter head 12. The motor unit 124 may be actuated or retracted in length by valve mechanism which itself may be actuated by contact between the reciprocal head 12 and the valve mechanism at the ends of the head's travel, and with such valve mechanism being adjustable for accommodating different lengths of slabs. Such valve mechanism could also be controlled by weight, assuming a substantialy standard length of cut slab.

Figure 8:
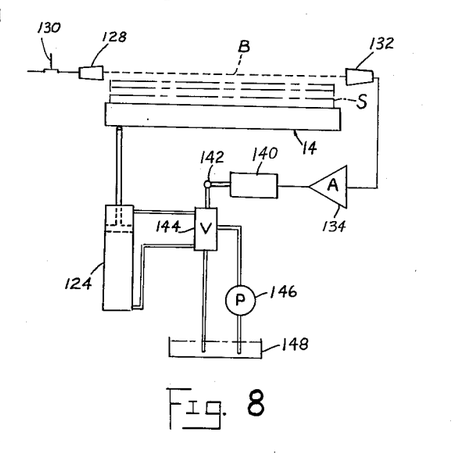
FIG. 8 is a diagrammatic illustration of a system for automatically controlling a movable platform which may receive the cut strip material thereon.

Referring now to FIG. 8, there is diagrammatically illustrated a system for automatically lowering the platform 14, as the latter receives the cut slabs of stock material S thereon, and thus maintain a generally constant distance between the top of the growing pile of cut stock material and the underside of the cutter head 12. Such a system may comprise a conventional photo-electric unit 128. which may be controlled by switch 130, and which transmits a beam B of light to photo-electric receiver or eye 132. Receiver 132 may be operably coupled to conventional electronic signal amplifier 134 which in turn may be operably coupled to an actuator, such as a solenoid 140. Solenoid 140 may be operably coupled as at 142 to control valve mechanism 144 which applies pressured fluid from pump 146 and reservoir 148 to reciprocal motor unit 124, which as aforedescribed is operably coupled to the platform 14. When the stack of cut slabs grows to such a height on platform 14 that the beam B is broken, the fluid motor unit 124 is actuated by valve 144 and via solenoid 140, to automatically lower the platform an amount sufficient to lower the top surface of the stack S below the beam B, thus maintaining a generally constant distance between the top of the growing stack of slabs and the underside of the cutter head.

Referring now to FIGS. 10 through 15B, there is illustrated another embodiment of the cutter and stacker mechanism, and wherein an elevatable and retractible fork mechanism is used in conjunction with a rotatable table mechanism, for facilitating the stacking and the handling of the cut slab material.

Such further embodiment includes supporting framework structure 10' and cutter head mechanism 12' lengthwise movable with respect to framework 10', and in a generally similar manner as the first described embodiment of the invention. However, in this embodiment, and in accordance with the invention, there is provided a rotatable table mechanism 150, which is disposed for movement beneath the aforementioned cutter head 12', and which is adapted to receive skids S' thereon, for supporting stacks of the cut slabs of stock material. There is also provided an elevatable and retractible lift mechanism 152 adjacent the rotatable table mechanism 150, with such lift mechanism being adapted to raise an associated skid S' upwardly to a predetermined position beneath the cutter head 12', and to maintain substantially constant the distance between the underside of the cutter head and the top of the stack of slabs on the respective skid.

Figures 11, 12:
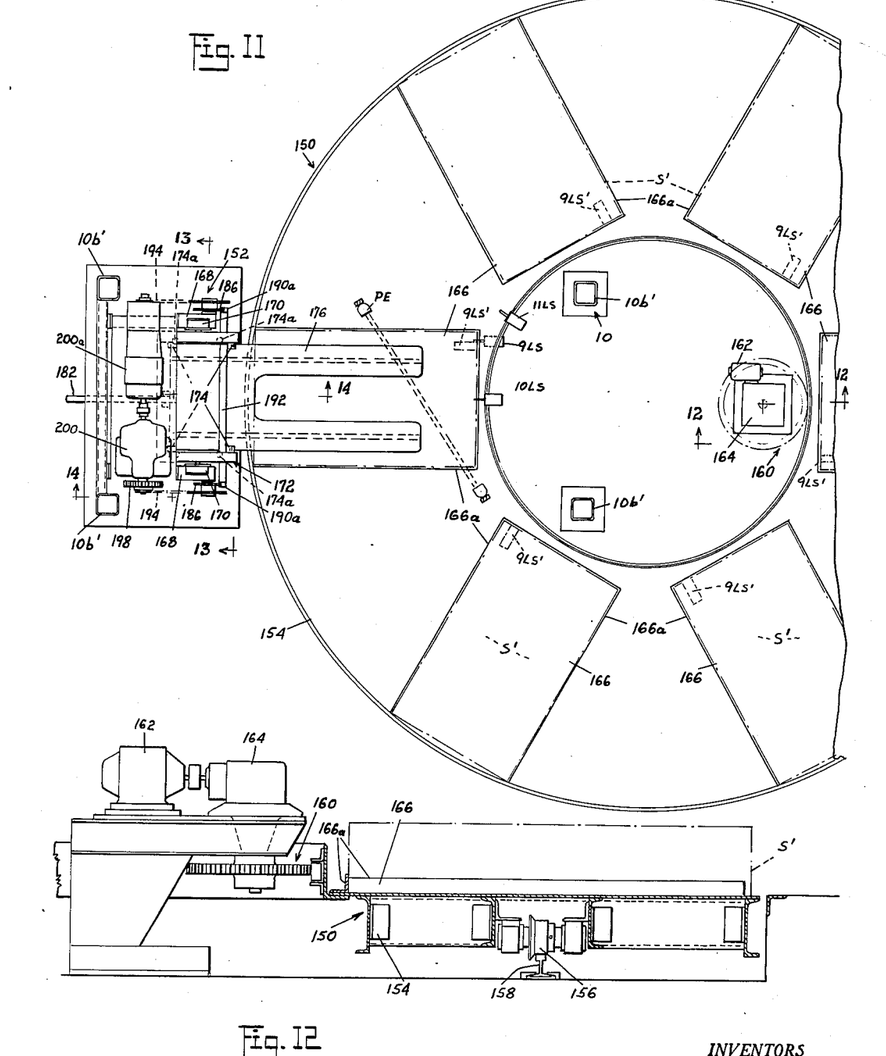
FIG. 11 is a fragmentary, top plan view of the FIG. 10 embodiment, but with the cutter mechanism having been removed, and more particularly illustrating the aforementioned lift mechanism and associated rotatable table mechanism, together with control means for maintaining substantially constant distance between the top of the stack of cut slabs and the underside of the cutter head.
FIG. 12 is an enlarged sectional view taken generally along the plane of line 12—12 of FIG. 11.
Figure 13:
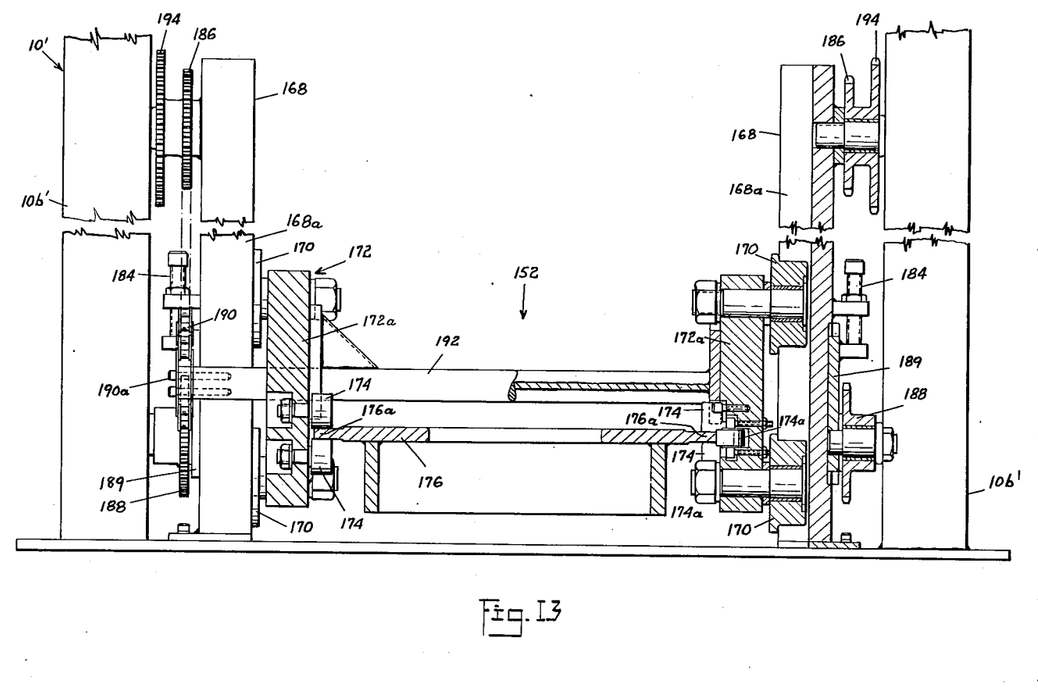
FIG. 13 is an enlarged, broken sectional view taken generally along the plane of line 13—13 of FIG. 11 looking in the direction of the arrows.

Referring now in particular to FIGS. 11 and 12, the table mechanism 150 comprises a circular or doughnut shaped framework 154 mounted on flanged wheel mechanism 156, with the latter being adapted to engage and be guided by a circular rail 158, disposed underneath the table. The table may be suitably driven by means of a sprocket and chain drive 160, powered by means of an electric motor unit 162 and associated geared transmission 164. The table mechanism is provided with a plurality of stations 166 thereon, which may include raised flange or boundary portions 166a for guiding and receiving the aforementioned skids S' at each such station.

The lifting mechanism 152 comprises a frame including transversely spaced uprights 168 having front and rear flanges 168a (FIG. 13) defining vertical guideways receiving therein flanged wheels 170 rotatably mounted on framework sub-assembly 172. Framework 172 includes spaced side wall portions 172a having mounted thereon roller means 174, 174a which movably support fork mechanism 176 thereon for movement in a generally horizontal plane. As can be seen from FIG. 13, the fork mechanism 176 comprises lateral flange portions 176a which are received between the aforementioned rollers 174 on the side walls of the elevator framework 172, and such fork mechanism 176 is provided with a rear bracket 178 which releasably coacts with a hook 180 on the leading end of the piston rod 182 of reciprocal fluid powered motor unit 184.

In order to move the elevator framework 172 and associated fork mechanism 176 upwardly with respect to the uprights 168, there is provided upper, rotatable driver wheels or sprockets 186 mounted on the uprights 168, and lower rotatable sprocket or wheel members 188 likewise mounted on the uprights. Lower sprocket members 188 are preferably adjustably mounted on vertically shiftable plates 189 on the uprights for adjustment thereof in a vertical direction, and as by means of set-bolt mechanism 184.

Looped around each pair of the upper and lower sprocket members 186, 188 is a respective chain member 190. Each chain member 190 is attached as at 190a to a respective end of transversely extending rod 192 extending outwardly from the side wall portions 172a of the elevator frame 172, and forwardly of uprights 168. Upper sprockets or wheels 186 are driven by means of chain and sprocket drives 194 and coacting gear drive 196 which is preferably gears as at 198 to a multi-speed, reversible electric motor 200. It will be seen, therefore, that upon rotation of the motor and associated gear 198 in the direction of the full line arrow illustrated in FIG. 14, the upper sprockets 186 will be rotated in a counterclockwise direction (as viewed in FIG. 14) thereby tensioning the forward stretch of the chain 190 on either side of the elevator framework 172 and lifting the elevator mechanism and associated forks 176 upwardly to predetermined location beneath the cutter head 12'. Upon rotation of the motor 200 in the opposite direction or in the direction of the phantom line arrow of FIG. 14, the elevator frame 172 and associated fork mechanism 176 is lowered. The motor 200 has electro-responsive disc braking mechanism 200a (FIG. 11) of conventional type coupled thereto, for a purpose to be hereinafter described.

The elevator frame 172 includes a resilient or spring loaded locking means 204 (FIGS. 14, 14B) which is adapted to prevent inadvertent horizontal movement of the elevator frame 172 and associated fork 176 with respect to one another when the latter is in a raised position and may be supporting a skid thereon. Locking means 204 includes a spring loaded shiftable stem 206 (FIG. 14) mounted on a side wall 172a of elevator frame 172 and including a depending locking lug portion 206a which is adapted to be received in a complementary opening 208 in a respective flange 176a of the fork mechanism 176. When the elevator frame 172 and associated fork 176 is in lowered position as shown in FIG. 14, the lower end of stem 206 abuts the floor and raises the locking lug 206a out of opening 208, to unlock the fork mechanism 176 with respect to the elevator frame 172. When a particular skid has been loaded with a predetermined height stack of cut slabs, the reciprocal motor unit 184 is retracted, thereby causing rolling of fork mechanism 176 on rollers 174 and with respect to elevator frame 172, and withdrawing of the fork mechanism from beneath the skid, and thereby permitting rotation of the table 150 to present an empty skid to the fork mechanism and associated elevator frame. Movement of a loaded skid from beneath the cutter head due to rotation of the table causes rupture of the connecting sections 113a connecting the top slab of the stock to the stock material coming down through the cutter head.

It will be noted that the coupling 178, 180 which connects the retractible fork mechanism 176 with the motor unit 184 is of the separable type, so that the elevator framework 172 can be moved vertically with respect to the motor unit 184 without interference, but which will automatically couple with the piston rod 182 of the motor unit on lowering of the elevator framework 172 to its lowermost position.

Figures 10, 14B:
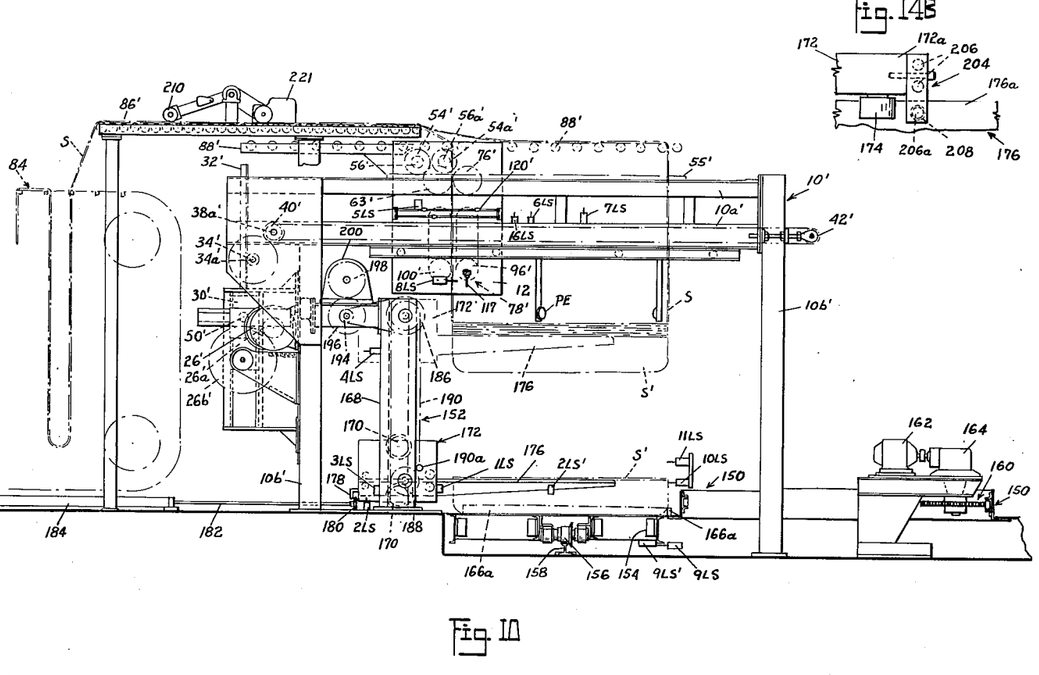
FIG. 10 is a side elevational, partially broken view of a further embodiment of the cutter and stacker, and one embodying a rotatable table and an elevatable and retractible lift or hoist mechanism for handling the cut or perforated slabs of stock.
FIG. 14B is a reduced size, fragmentary plan view taken generally along line 14B—14B of FIG. 14.

Referring to FIG. 10, the threading conveyor 86' preferably has a motor driven roller 210 associated therewith adapted for manual movement by the machine operator into contact with the strip of stock coming off the batch-off mechanism 84, to facilitate movement of the strip of stock along the conveyor 86' to the cutting head 12'. This mechanism will be further described in connection with the operation of the machine.

Figure 15:
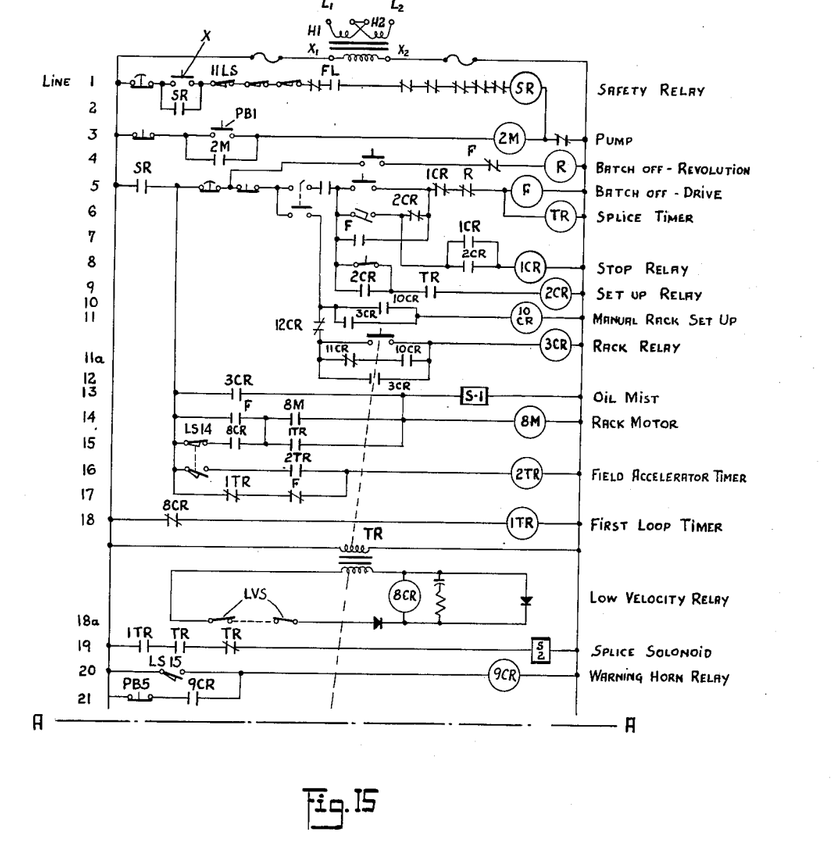
FIGS. 15, 15A and 15B are schematic illustrations of an electrical system for operating and controlling the mechanism of the invention, and especially the mechanism of FIGS. 10 to 14B.
Figure 15A:
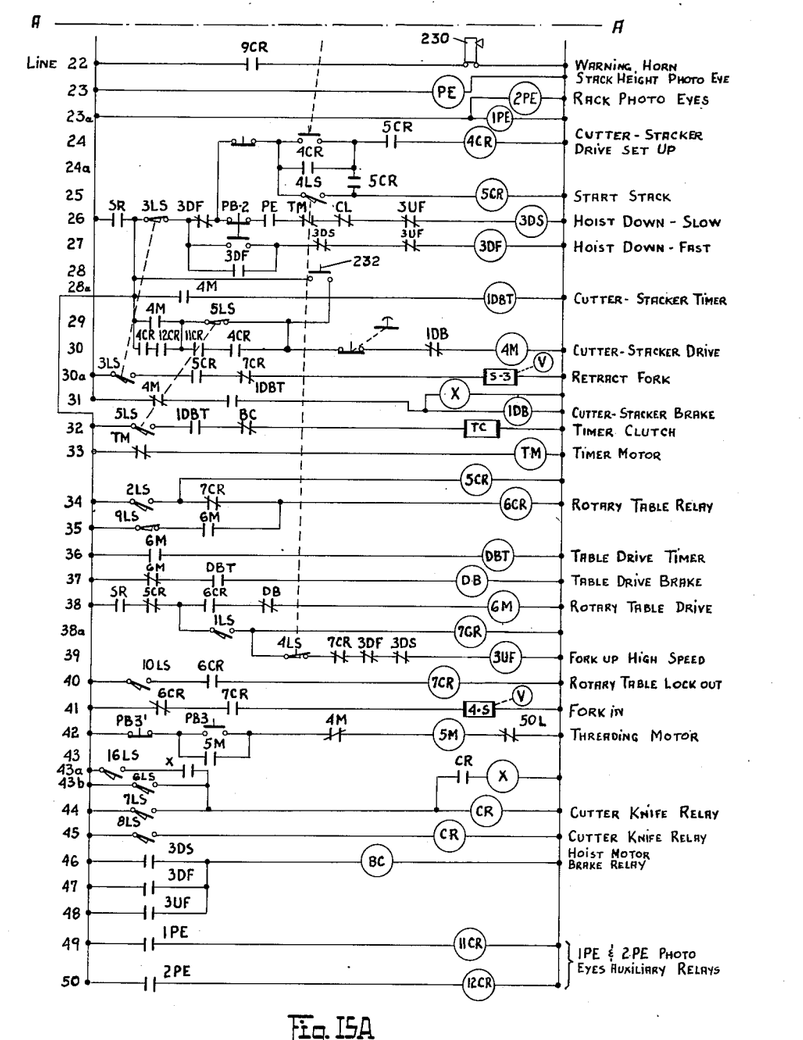
Figure 15B:
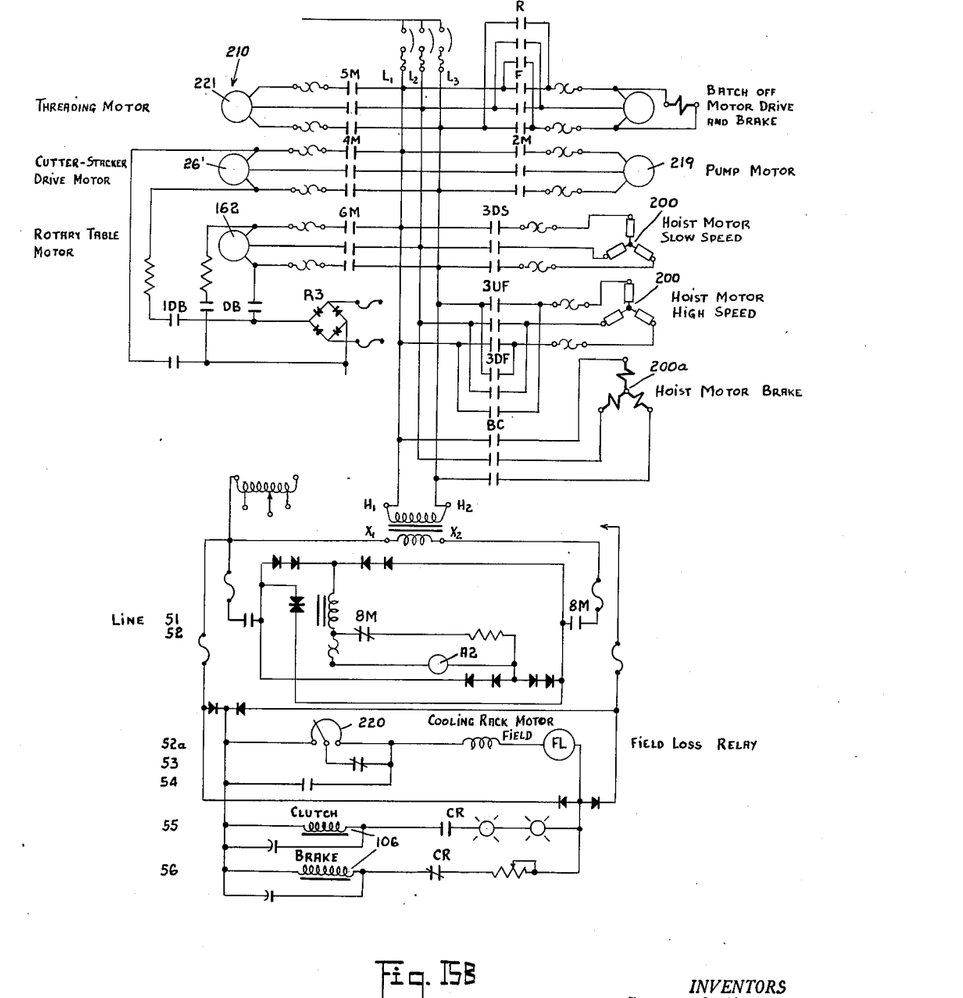

Automatic operation of the mechanism is preferably as follows:

Referring now in particular to FIGS. 15, 15A and 15B, FIG. 15 represents a substantially conventional system for controlling the conventional batch-off mechanism, well known in the rubber art. The purpose of illustrating the batch-off control system is that the system for controlling the cutter-stacker mechanism with which the present invention is particularly concerned, may be tied in with the conventional batch-off control, and in a manner hereinafter set forth. The electrical lines in FIGS. 15, 15A and 15B have been numbered to the left thereof for aiding in the location and identification of the various components thereof. In FIGS. 15 and 15A, the function of the components in the respective line has been listed to the right hand side thereof. The batch-off mechanism 84 may be started by means of the push button PB-1 (line 3) which actuates the starter 2M of pump motor 219 of the conventional cooling tank, and the batch-off mechanism will move a strip of stock material from the conventional mixing mill, not shown, and in the conventional manner. The cooling rack conveyor motor A2 (FIG. 15B) of the batch-off mechanism will start automatically in approximately three seconds after the ribbon or strip of stock material reaches and actuates the limit switches LVS in line 18a. Timer relay 1TR (line 18) delays the starting of the rack conveyor motor A2. This timer relay 1TR can be adjusted if more or less time is needed for the starting of the cooling rack conveyor.

When the signal is given by the timer 1TR for the rack conveyor to start, it will run at a relatively slow speed (for instance approximately 4 feet per minute) until a rack bar of the rack conveyor directly under the proximity switch LS14 (lines 15 and 16) travels out of the switch's sensing field. The rack conveyor will then go into a higher speed (approximately 12 feet per minute) for the amount of time that the timer relay 2TR (line 16) is set. (The timer relay 2TR has preferably been initially set for approximately four seconds.) After the elapsing of this time, the rack conveyor motor A2 will slow down to the speed that has been set by the loop size rheostat control 229 (line 52a). In other words, the size of the loops of the stock in the cooling rack conveyor is determined by adjusting the speed of the rack conveyor motor by means of the loop size control rheostat 229 which is located at the loading end of the rack conveyor. This then brings the continuous strip of stock material up to the threading conveyor 86' of the cutter-stacker unit.

As the stock reaches the exit end of the rack conveyor, and between photocells 1PE and 2PE (line 23a) thereby breaking the beams of such photocells, the strip stock is passed to the threading conveyor 86' and is advanced along the threading conveyor by means of the aforementioned drive mechanism 210. This mechanism 210 is manually started by pressing the start button PB3 (line 42) thereby actuating starter 5M and actuating the threading motor 221 FIG. 15B. This threading roll mechanism will pull the stock out of the rack conveyor and bring it to the cutter stacker head. The leading end of the ribbon of stock material is then fed down into the cutter head and into the feed rolls 63', 76', and then the threading mechanism 210 is manually deactuated by pushing the stop button PB3' (line 42) and swinging the mechanism up out of coacting relation with the strip of stock material.

We will assume for purposes of discussion that the fork 176 of the hoist mechanism 152 is disposed in retracted position and therefore limit switch 2LS (line 34 of FIG. 15A and FIG. 10) is closed, due to its actuation by the dog 2LS' (FIG. 10) on the retracted fork. In other words, limit switch 2LS is operated by the retracted fork 176 of the hoist mechanism, and controls the starting of the motor 162 powering the index table 150. Control relay 6CR (line 34) is thus energized and its contact 6CR in line 38 is closed. To start the index table 150 in motion, the operator may depress the reset button X (line 1, FIG. 15). This pulls in safety relay SR (line 1) whose contact SR (line 38) will then pull in the rotary table index motor starter 6M (line 38) thereby actuating the table motor 162. The index table 150 will continue to rotate until an empty skid S' stationed on the table actuates limit switch 10LS (line 40 and FIG. 11). Actuation of the limit switch 10LS energizes latch relay 7CR (line 40) and the 7CR contact (line 34) locks out index relay 6CR (line 34) thereby indicating that a skid S' is in proper position. The index table continues to rotate for a few degrees until a limit switch 9LS (FIG. 10 and line 35) is tripped or opened by a cam or actuating abutment 9LS' on the index table 150. There are six of these actuating abutments 9LS' on the index table, one for each skid position or skid station 166. When limit switch 9LS has thusly been opened, it drops off index relay 6CR in line 34. 6CR contact in line 41 then closes, relay 7CR contact in line 41 having been previously closed as discussed above in connection with limit switch 10LS, and therefore the solenoid 4S is energized which actuates an associated valve V controlling motor unit 184, thereby sending the fork 176 forwardly under the skid.

The index table motor 162 may be provided with conventional dynamic braking by applying a D.C. voltage to the A.C. windings, to obtain quick stopping of the rotary table. In this connection when the 6M starter (line 38) for the motor 162 is running, interlock 6M (line 36) is closed which energizes timer DBT (line 36). The contact DBT in line 37 is then closed. When the index table motor 162 is deenergized by limit switch 9LS as aforediscussed, contact 6M (line 37) then recloses and the circuit is made to the contactor DB in line 37. This then applies the D.C. voltage from rectifier R3 (FIG. 15B) to the index motor's windings for a short period, say for instance one second. This timing is adjustable by a setting on the DBT timer (line 36).

Limit switch 1LS (FIG. 10 and line 38a) is tripped by the fork 176 at the forward end of its stroke, and when the fork is in forwardmost extended position. 1LS controls the hoist motor 200 and is adapted to start the elevator frame 172 upwardly. 1LS thus unlatches relay 7CR, and the 7CR contact in line 39 then recloses allowing the hoist motor starter 3UF in line 39 to be energized, and starting the elevator frame 172 and associated fork in the up direction at a high speed. As the elevator and fork assembly reaches the top limit of its travel between uprights 168, limit switch 4LS (line 39 and FIG. 10) is opened by the upwardly moved elevator and fork mechanism, and deenergizes the hoist motor starter 3UF in line 39. The other half of the limit switch 4LS (line 25) closes and energizes latch relay 5CR (line 25). Relay contacts 5CR (lines 24, 25) then close and energize relay 4CR (line 24) which is the cutter-stacker drive set-up relay. 4CR contacts in line 30 are then closed.

As aforementioned, the hoist motor may be provided with conventional, spring loaded electro-responsive friction disc braking means 200a (FIG. 11). This is controlled by a brake contactor BC in line 46. Any time that the hoist motor 200 is run, this brake must be actuated. This is accomplished by contacts 3DS, 3 DF and 3UF in lines 46, 47 and 48 (FIG. 15A, 15B) respectively. When ever the hoist motor is then deenergized, the brake contactor BC (line 46) is deenergized and the hoist motor brake coils (FIG. 15B) are deenergized, and thus the spring loaded friction disc brakes are engaged to hold the elevator frame and fork at that position.

Control relays 11CR and 12CR in lines 49 and 50 respectively are actuated by the aforementioned photoelectric eye cells 1PE and 2PE (line 23a) on the rear end of the batchoff machine cooling rack. When stock is hanging in loops in the rack at the rear end thereof, these photoeyes (1PE and 2PE) will be broken and the relays 11CR and 12CR energized, which means that the contacts of relays 11CR and 12CR in line 30 will then be closed, allowing starter 4M to be energized. Starter 4M controls the cutter-stacker motor 26'.

At any time previously when the cutter-stacker motor 26' was stopped, the relay X in line 31 had been energized and latched up. This X relay is strictly a set-up relay used to control the timing of the first cut, and the X relay contact (line 43a) is in series with the limit switch 16LS (FIG. 10). This 16LS limit switch is operated by the cutter head 12' in the out direction or in a direction toward the right as viewed in FIG. 10. When 16LS is tripped, it energizes latch relay coil CR in line 44. This activates the clutch and deactivates the brake of clutch-brake mechanism 106, thereby causing an initial cut or perforation to be made in the stock material feeding down through the head. As can be seen when the cutter head 12' is moving in the outward direction or to the right as viewed in FIG. 10, limit switch 16LS is tripped before aforementioned limit switch 6LS. The purpose of limit switch 16LS is to provide a shorter time before the initial cut, since as the ribbon of stock material is initially fed down through the cutter head, the free end of the stock material drags somewhat across the surface of the receiving skid platform, and therefore the first slab laid on the platform skid is not of the proper length, but will be properly cut or perforated at the end of the slab. The X relay is then unlatched after this first cut, and thus is taken out of the circuit for any future cuts, and thus limit switch 16LS is taken out of the circuit for any future cuts. Whenever the cutter-stacker motor 26' is stopped at any time during its oscillating cycle, this automatically relatches up relay X in line 31, thus closing X contact in line 43a and setting up limit switch 16LS for another short timing cut on a "start-up."

When the cutter head is returning in a back direction limit switch 7LS will be tripped and actuate the clutch mechanism and deactivate the brake mechanism of clutch-brake 106, thereby causing the stock material to be sliced by the knife. Thus the cutter head reciprocates back and forth, operating limit switch 6LS in the out direction and limit switch 7LS in the return direction, thereby causing perforation of the stock material by the cutter 78', and in proper position to appear at the ends of the slabs.

When the knife relay CR (line 44) is latched up either by limit switch 16LS, 6LS or 7LS, the rotation of the knife roll 96' has to be stopped, and this is accomplished by limit switch 8LS which trips every revolution due to engagement of the aforementioned dog 117 on the cutter knife roll with the limit switch, which unlatches relay CR' (line 45) thus deactivating the clutch mechanism of clutch brake aparatus 106. Limit switch 8LS is a ride-over type so that when it is being tripped, the dog rides over the limit switch, and the latter is not held in a stopped position.

Photo-electric eye PE (line 23) which is the stack height photo eye, controls the lowering of the hoist mechanism via the low speed section of hoist motor 200. This contact is shown in line 26 and identified as PE. When the light beam (FIG. 11) is broken by the height of the stack, relay PE contact in line 26 is closed. Mechanism PE is disposed so as to cover only a corner of an associated skid, and thus the beam is not broken by the stock material coming down through the head when the latter is in its extreme left hand position.

There is also provided a timer TM (line 33) to control the time of drop of the hoist motor 200 with such timer being actuated by limit switch 5LS (line 32). Switch 5LS is actuated by the cutter head 12' in the latter's extreme left hand position (FIG. 10). If the light beam for the stack height is broken, the timer contacts TM in line 26 will be closed, and also the photo eye contacts PE (line 26) will be closed. This then allows the hoist motor 200 actuated by starter 3DS to "run down" or rotate in the direction of the phantom arrow in FIG. 14, at a slow speed, thereby lowering the elevator frame and associated fork mechanism. This hoist motor will cause lowering of the fork until one of two things happens. Either the timer TM will be timed out, or the photo light beam contact will be re-made. The breaking of the light beam by the stock is therefore effective to cause actuation of hoist motor 200 to automatically lower the elevator frame and fork, only when the cutter head is in its extreme left hand or "starting" position and in a manner to actuate limit switch 5LS (line 32), thereby obviating any effect from "transient" interruption of the light beam as the cutter head reciprocates back and forth and causes breakage of the beam by the stock material feeding down through the cutter head to the growing stack of slabs. However, when the cutter head is in its left hand position and should the measured stack height be such that the photo-electric eye contact PE was still closed, the TM timer setting, which normally is two or three seconds, would "time out" and the timer contact TM in line 26 would open and stop the hoist motor from moving the skid down. This timing contact TM is an overriding feature in that it would cut out the dropping of the elevator should a loop or fold of the rubber material give a false reading to the photo-electric eye, which may happen if the rubber slabs as they are laid down on the receiving table happen to have an extremely large loop in the measured end of one of the slabs as it is superimposed upon the other slab, thus giving a false indication of the stack height and causing the platform to drop too far. In this connection, the hoist motor 200 may be actuated at high speed to move the elevator and fork down by manual actuation of push button PB–2 in line 26, when it is desired to change a skid without waiting for the normal automatic and slow lowering of the skid. Accordingly, the three starters controlling the hoist motor are 3UF in line 39, 3DS in line 26, and 3DF in line 27. Each starter has associated therewith normally closed interlocks in the respective line to prevent any two of the three starters from being on at the same time.

The cutter-stacker unit continues to operate and fills the skid as the skid is automatically lowered by the lift mechanism as controlled by the timer TM and photo eye PE, the elevator frame and fork supporting the skid, with the latter dropping until a dog thereon hits limit switch 3LS (lines 26, 30a) and FIG. 10. 3LS contact in line 26 then opens, stopping the hoist motor in a down direction. The normally open contact on switch 3LS in line 30a is then closed. Relay contact 5CR in line 30a had been previously closed when the stacking operation was started. Therefore, since 3LS is now closed in line 30a, energization of solenoid S–3 (line 30a) occurs which will actuate the associated conventional four-way valve, which will retract the motor unit 184 and retract the fork. Limit switch 3LS therefore is actuated by the elevator and fork assembly in down position and stops the "down" actuation of the hoist motor and retracts the fork from beneath the associated skid. When the fork has been retracted, limit switch 2LS, is then actuated and pulls in relay 6CR in line 34, and relay contact 6CR in line 38 then closed, energizing once more the index motor starter 6M, thereby rotating the table 150 to present an empty skid to the hoist mechanism.

Referring now to FIGS. 15, 15A there is provided in the batch-off circuit a horn relay 9CR (line 20) to signify to an operator that a different type of rubber is coming from the molding room. Should a different type of rubber be compounded and inserted in the loop rack, the mill operator will insert a clip over the end of one of the bars of the rack at the beginning of this new type of rubber. When this clip travels down to the end of the rack it will automatically trip a limit switch LS15 (line 20) which energizes relay 9CR which in turn closes 9CR contact in line 22 which will cause the horn 230 to blow a signal. This signals the operator that a new type of rubber is coming off the cooling rack, and that he should finish out a skid and bring a new skid into position to take this new type of rubber. In other words the rubber manufacturers do not generally want to mix two different types of rubber on one skid. Push button PB5 (line 21) may be used to stop the horn's blowing.

To finish out a partially filled skid with the one type of rubber, the cutter stack operator will actuate the cutter motor tail-out button 232 in line 28. This push button has to be used since at this stage of stack height, photo-electric eyes 1PE and 2PE at the end of the rack conveyor will not be broken by the terminated strip of stock and would not allow the cutter motor and associated starter 4M to be energized. When the final cut is made in the stock and the tail of the ribbon of stock is all the way through the cutter head, the operator will remove his hand off the cutter tail button 232 and the carriage head will position to the left hand side of framework 10' as viewed in FIG. 10.

This starting position of the cutter head is accomplished by limit switch 5LS in line 29. The cutter-stacker drive motor starter 4M in line 30 is kept energized through limit switch 5LS and contact 4M in line 29. The cutter-stacker tail-out button 232 has been opened up upon release of the operator's finger as aforedescribed, but the motor 26' continues to run until 5LS is tripped in the extreme left hand position of the cutter head. Quick stopping of this cutter-stacker motor 26' is accomplished by applying a D.C. voltage to the A.C. windings in a similar manner as aforediscussed in connection with the index table motor 162. Two A.C. and D.C. voltages cannot be applied at the same time. However, when the 4M starter, in line 30, has become deenergized, a contact 4M in line 31 then recloses. Previously timer 1DBT in line 28a had been energized due to the fact that the 4M starter had been energized, and the contact 4M in line 28a had been closed. Since 1DBT has been energized while the cutter-stacker motor has been running, 1DBT contact in line 31 has been closed. When the 4M contact in line 31 now recloses when the cutter-stacker motor 26' stops, a circuit is made to the 1DB coil (line 31) thereby applying the D.C. voltage and actuating the dynamic brake mechanism on the cutter-stacker motor. Thus this 1DB contactor is the contactor that applies the D.C. voltage to the motor windings of the cutter-stacker drive motor 26'. D.C. voltage is obtained from rectifier No. 3, FIG. 15B, and the length of time that this D.C. voltage is applied is obtained by the setting of the 1DBT timer. This time setting is adjustable and is usually in the order of one second.

There is also provided a limit switch 11LS (FIG. 10 and line 1, FIG. 15) which has a spring loaded arm adapted for engagement with a stack of the slabs and is operative to deactivate safety relay SR (line 1) and stop the entire machine. This limit switch will be actuated if the table indexes a loaded skid into loading position beneath the cutter head. This would only occur if the machine operator was not around to remove the loaded skids from the table, and thus is a safety feature. Since the skids are disposed at floor level (see FIG. 12), the loaded skids may be readily removed from the index table after they move out from under the cutting head, and for instance by using a fork truck or the like.

While an automatic system has been shown for elevation and retraction of the hoist mechanism, and rotation of the rotary table, to remove a full skid from beneath the cutter and move an empty skid underneath the head, it will be understood that such operations could be controlled by an operator stationed at the machine.

From the foregoing discussion and accompanying drawings it will be seen that the present invention provides a novel apparatus for taking a continuous ribbon or strip of stock material and cutting it into predetermined length slabs and stacking such slabs on a receiving surface, for ready use in the formation of a product. It will also be seen that the invention provides a machine that is provided with a reciprocal head, wherein the stroke of reciprocation of the head may be varied, to thereby vary the length of slab being produced from the ribbon of stock, and wherein the stock is cut into the predetermined lengths by means of a spiral knife which is operative adjacent the ends of stroke of the reciprocal head, and with such knife being controlled by a brake-clutch mechanism, actuated by movement of the head. The invention also provides a novel arrangement for maintaining a generally constant distance between a growing stack of cut material and the underside of the cutter head, and for sequentially handling the stacks of cut material.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

We claim:
1. A cutter and stacker mechanism for elongated strip material comprising
   (a) a frame,
   (b) a head mounted on said frame for reciprocating movement,
   (c) a rotary cutting couple having cutting means, on said head,
   (d) a rotary feed means on said head for feeding strip material to said rotary cutting couple,
   (e) drive means for reciprocating said head through a predetermined stroke, and
   (f) drive means for rotating said cutting couple in timed relation to said feed means, and actuating said cutting means at predetermined intervals in the travel of said head whereby said strip material will be cut into predetermined lengths, said lengths being generally commensurate with the stroke of said head, whereby said lengths will be stacked upon one another during reciprocation of said head.

2. A cutter and stacker mechanism in accordance with claim 1 including
   (a) means for selectively adjusting the length of stroke of said head.

3. A cutter and stacker mechanism in accordance with claim 2 wherein said drive means for said cutting couple includes
   (a) an electro-responsive clutch-brake mechanism operatively coupled to said cutting couple, and
   (b) associated limit switch means on said frame operatively coupled to said clutch-brake mechanism for actuating the latter, and
   (c) means on said head for actuating engagement with said limit switch means adjacent the ends of said stroke.

4. A cutter and stacker mechanism in accordance with claim 2 wherein said head includes
   (a) roller means thereon disposed intermediate said feed means and said cutting couple for guiding the movement of the strip stock material down to said cutting couple.

5. In a cutter and stacker mechanism for elongated strip material,
   (a) a frame,
   (b) a head,
   (c) means mounting said head on said frame for lengthwise movement thereof, said means comprising a plurality of rollers rotatably mounted on said head and runnig on complementary trackways on said frame,
   (d) cutter means on said head,
   (e) means on said head for feeding strip material toward and through said cutter means,
   (f) means for actuating said cutter means at predetermined locations in the travel of said head,
   (g) means for reciprocating said head, said head reciprocating means comprising a power unit,
   (h) an eccentric coupled to said power unit,
   (i) rotary means mounted on said frame,
   (j) gear means coupling said eccentric to said rotary means, (k) elongated flexible means coacting with said rotary means and being operably connected to said head for reciprocating said head, and (l) means for adjusting the throw of said eccentric to thereby adjust the length of travel of said head.

6. A cutter and stacker mechanism for elongated strip material comprising (a) a frame, (b) a head mounted on the frame for lengthwise movement with respect thereto, (c) cutter means on said head, said cutter means being angularly disposed with respect to said head, (d) means on said head for feeding stock material to said cutter means, (e) means for reciprocating said head, (f) means for maintaining said cutter means and feeding means in surface speed synchronization with the reciprocation speed of said head, (g) and means for actuating said cutter means at predetermined intervals in the travel of said head, said last mentioned means comprising (h) electro-responsive clutch means on said head operable between said cutter means and said feeding means, (i) switch means mounted on said frame and operably coupled to said electro-responsive clutch means, and (j) actuating means on said head adapted for engageable relation with said switch means to thus actuate said clutch means.

7. A cutter and stacker mechanism in accordance with claim 6 wherein said feeding means comprises (a) a pair of opposed rollers rotatably mounted in said head, (b) means swingably mounting one of said rollers, and (c) snubber means coacting between said one roller and said head for resiliently urging said rollers together.

8. A cutter and stacker mechanism in accordance with claim 6 wherein said cutter means comprises (a) a cylindrical-like roll having a spiral-oriented knife thereon, and (b) an anvil roll disposed in coacting relationship with said knife upon rotation of said knife roll.

9. A cutter and stacker mechanism in accordance with claim 8 including (a) means coacting with said knife and said anvil roll for only partially severing the strip material to maintain connecting sections of the material between the cut portions thereof.

10. A cutter and stacker mechanism for elongated strip material comprising (a) a frame, (b) a head mounted on said frame for reciprocal movement lengthwise thereof, (c) a rotary cutting couple having cutting means, on said head, (d) a rotary feed means on said head for feeding strip material toward said cutting couple, (e) drive means for reciprocating said head through a predetermined stroke, (f) drive means for rotating said cutting couple in timed relation to said feed means and actuating said cutting means at predetermined intervals in the travel of said head to cut the strip material into predetermined lengths, and (g) means coacting between said feed means, said cutting couple and the first mentioned drive means to maintain the speed of travel of the head in synchronization with the feed of strip material to said cutting couple, said last mentioned coacting means comprising (h) overrunning clutch means on said head, (i) a stationary rack on said frame disposed along the path of travel of said head, and (j) gear means on said head coacting with said rack and said clutch means.

11. A cutter and stacker mechanism for elongated strip material comprising (a) a frame, (b) a carriage mounted on the frame for lengthwise movement with respect thereto, (c) means for reciprocating said carriage, said means including (d) a crank and coacting rack and pinion mechanism, (e) means for adjusting the throw of said crank to thus adjust the length of travel of said carriage, (f) feeder means mounted on said carriage, (g) conveyor means on said frame for transferring strip material to said feeder means, (h) cutter means rotatably mounted on said carriage in angularly oriented relation with respect to the feeder means, said cutter means including (i) a cylinder having a spirally oriented knife extending around a major portion of the circumferential dimension thereof, (j) said cutter means having an electro-responsive brake-clutch mechanism coupled thereto, (k) switch means operably coupled to said brake-clutch mechanism, (l) means on said carriage adapted for actuating engagement with said switch means for actuating said brake-clutch mechanism and thus rotating said knife cylinder whereby the strip material will be cut into predetermined lengths, (m) means for adjusting said actuating means with respect to said carriage to thus coordinate the rotation of said cutter means with the travel of said carriage, and (n) means for maintaining said cutter means and feeder means in constant surface speed synchronization with the oscillation speed of said carriage.

12. A cutter and stacker mechanism in accordance with claim 11 wherein said cutter means includes (a) a rotatable anvil roll normally disposed in spaced relation to the knife of said cutter means but which engages said knife during rotation of said knife cylinder to cut the strip material, said anvil roll including (b) a plurality of circumferentially extending, axially spaced recesses therein.

References Cited by the Examiner

UNITED STATES PATENTS

| | | | |
|---|---|---|---|
| 1,481,183 | 1/1924 | Browne | 83—92 |
| 2,066,566 | 1/1937 | Janson et al. | 83—29 |
| 2,205,767 | 6/1940 | Lamb | 271—88 |
| 2,314,036 | 3/1943 | Dressel et al. | 83—29 |
| 2,549,202 | 4/1951 | Idelman | 83—89 |
| 2,787,462 | 4/1957 | Morin | 270—79 |
| 2,849,236 | 8/1958 | Beaulieu | 271—88 |
| 2,895,552 | 7/1959 | Pomper et al. | 83—92 |
| 3,083,008 | 3/1963 | Miller | 270—31 |
| 3,094,319 | 6/1963 | Diechmann | 270—31 |

FOREIGN PATENTS 413,817    8/1910    France.

EUGENE R. CAPOZIO, *Primary Examiner.*

HUNTER C. BOURNE, JR., *Examiner.*